(12) United States Patent
Benoni

(10) Patent No.: US 9,542,033 B2
(45) Date of Patent: Jan. 10, 2017

(54) DEVICE FOR INTERACTIVE CONTROL

(71) Applicant: INTEREL TRADEMARKS B.V., Amsterdam (NL)

(72) Inventor: Andrea Benoni, Cavaion (IT)

(73) Assignee: INTEREL TRADEMARKS B.V., Amsterdam (NL)

( * ) Notice: Subject to any disclaimer, the term of this patent is extended or adjusted under 35 U.S.C. 154(b) by 57 days.

(21) Appl. No.: 14/400,971

(22) PCT Filed: May 15, 2013

(86) PCT No.: PCT/IB2013/053977
§ 371 (c)(1),
(2) Date: Nov. 13, 2014

(87) PCT Pub. No.: WO2013/171695
PCT Pub. Date: Nov. 21, 2013

(65) Prior Publication Data
US 2015/0097787 A1    Apr. 9, 2015

(30) Foreign Application Priority Data

May 15, 2012    (IT) .............................. VR2012A0090

(51) Int. Cl.
*G06F 3/041*    (2006.01)
*H05B 37/02*    (2006.01)
*G09G 5/10*    (2006.01)

(52) U.S. Cl.
CPC ............... *G06F 3/0416* (2013.01); *G09G 5/10* (2013.01); *H05B 37/0227* (2013.01); *H05B 37/0245* (2013.01); *G06F 3/041* (2013.01); *G06F 2203/04101* (2013.01); *G09G 2320/0633* (2013.01); *G09G 2354/00* (2013.01); *Y02B 20/44* (2013.01)

(58) Field of Classification Search
CPC .................... G06F 3/041; G06F 3/0416; G06F 2203/04101; G09G 2320/0626; G09G 2320/0633
USPC ........................................................ 345/173
See application file for complete search history.

(56) References Cited

U.S. PATENT DOCUMENTS

| | | | |
|---|---|---|---|
| 5,396,443 A | 3/1995 | Mese et al. | |
| 5,489,827 A * | 2/1996 | Xia | .................... H05B 37/0227 315/154 |
| 6,107,930 A | 8/2000 | Behlke et al. | |

(Continued)

*Primary Examiner* — Jason Mandeville
(74) *Attorney, Agent, or Firm* — Pearne & Gordon LLP

(57) ABSTRACT

Described is an interactive control device (1) for at least one service apparatus (2), comprising a control unit (3), a screen (4) operatively connected to the control unit (3) having touch selection means (5) for interacting with the user. The touch selection means (5) are configurable between an active condition wherein they receive the touch information of the user and an inactive condition wherein they do not receive the touch information of the user. More specifically, the interactive control device (1) comprises a presence and distance sensor (7) operatively connected to the control unit (3) and configured for generating a detection signal (8) representing the presence and the distance of a user relative to the sensor (7). The control unit (3) is configured for receiving the detection signal (8), for processing it and for generating a control signal of at least part of the service apparatus (2) as a function of the processing.

11 Claims, 7 Drawing Sheets

(56) References Cited

U.S. PATENT DOCUMENTS

| | | | |
|---|---|---|---|
| 7,268,682 B2* | 9/2007 | Bialecki, Jr. | H05B 37/0227 |
| | | | 315/149 |
| 8,325,040 B2* | 12/2012 | Nassimi | H05B 37/0218 |
| | | | 340/567 |
| 8,766,657 B2* | 7/2014 | DeJean | H03K 17/955 |
| | | | 324/519 |
| 2006/0250745 A1 | 11/2006 | Butler et al. | |
| 2007/0236360 A1 | 10/2007 | Fitzgibbon | |
| 2009/0207122 A1 | 8/2009 | Cheng et al. | |
| 2009/0284386 A1* | 11/2009 | Nassimi | H05B 37/0218 |
| | | | 340/686.6 |
| 2011/0140611 A1 | 6/2011 | Elek et al. | |
| 2012/0131229 A1* | 5/2012 | McCarthy | G06F 1/3203 |
| | | | 710/5 |

* cited by examiner

DEVICE FOR INTERACTIVE CONTROL

TECHNICAL FIELD

This invention relates to an interactive control device for at least one service apparatus.

More specifically, this invention relates to the sector of electronic control devices connected to a plurality of service apparatuses to control them.

BACKGROUND ART

The term "service apparatuses" means the set of apparatuses present in a room designed to provide a service to the user of the room. In detail, the service apparatuses comprise the lighting system of the room, the heating/cooling system of the room, the movement of the window blind systems (for example, shutters), etc. . . . In other words, the control system is used to control the lights, the heating, etc. . . . of a room. Preferably, this invention is used for controlling the service apparatuses of a hotel room.

Advantageously, the interactive control device comprises a touchscreen which allows a user who enters a room to control, as required, the service apparatuses (for example, adjust the room temperature, switch ON the lights, etc. . . . ).

According to the prior art, the control device comprises a control unit connected to at least one service apparatus and a screen operatively connected to the control unit. As already mentioned, the screen comprises touch selection means for interacting with a user. In this way, the user can control the service apparatuses as required, using the screen.

Some examples of control devices are described in the prior documents US 2007/236360, US 2009/207122, US 2006/250745, U.S. Pat. Nos. 5,396,443, 6,107,930. It should be noted that the touch selection means are defined by a capacitive layer of the screen and by a control unit operatively connected to the capacitive layer for translating the selection made on the capacitive layer into information relative to the position of the point selected by touch.

However, to save energy, the screen is configurable in the prior art between an active condition wherein it transmits the information collected from the touch selection to the control unit and an inactive condition wherein it interrupts the transmission of the information collected from the touch selection to the control unit. More specifically, according to the prior art, during the active condition the capacitive layer and the relative control unit are powered, whilst during the inactive condition the capacitive layer and the relative control unit are not powered. In this way, the capacitive layer and the relative control unit of the screen are only powered during the active configuration of the screen thus allowing an energy saving.

In this regard, the prior art device comprises means for enabling the screen operatively associated with the screen and which can be activated by a user for configuring the screen between the active configuration and the inactive configuration. This solution allows an energy saving as the capacitive layer and the relative control unit are only powered following activation of the screen by the user.

Normally, the enabling means comprise at least one mechanical key in such a way that, by pressing the key, the screen changes from the inactive configuration to the active configuration.

Practically, according to the prior art, the user must press the mechanical key to activate the screen and, then, interact with the control unit using the touchscreen system.

This prior art, however, is not free of drawbacks.

A first drawback is linked to the fact that, according to the prior art, the screen must be activated by a mechanical action. Consequently, the user must identify the touchscreen and activate it by pressing the mechanical key.

For this reason, to control the service apparatuses (switch ON the lights, activate the heating, etc. . . . ) it is necessary, as a first operation, to press the mechanical key.

A second drawback is linked to the fact that, having entered the room, the user is not always able to identify the screen at first sight. In effect, normally, the screen has the appearance of a dark colored panel which is difficult to identify.

Moreover, it should be noted that not all the rooms have this technology, but could have systems for controlling the lighting and the heating of the traditional type (push-button switches and thermostats). For this reason, when entering the room the user might not expect to find an interactive control device with a touchscreen. Consequently, having entered a hotel room, the user must place the luggage on the floor and search for the control device to press the key in such a way as to activate at least the lights.

DISCLOSURE OF THE INVENTION

In this situation the aim of this invention is to provide an interactive control device which overcomes the aforementioned drawbacks.

In particular, the aim of this invention is to provide an interactive control device which can be easily identified by a user.

The aim of this invention is also to provide an interactive control device which is at least partly independent with respect to the presence of the user.

The aims indicated are substantially achieved by an interactive control device as described in the appended claims.

BRIEF DESCRIPTION OF DRAWINGS

Further characteristic features and advantages of this invention will emerge more clearly from the detailed description of several preferred, but not exclusive embodiments of an interactive control device illustrated in the accompanying drawings, in which.

DETAILED DESCRIPTION OF THE PREFERRED EMBODIMENTS OF THE INVENTION

Figure 1:
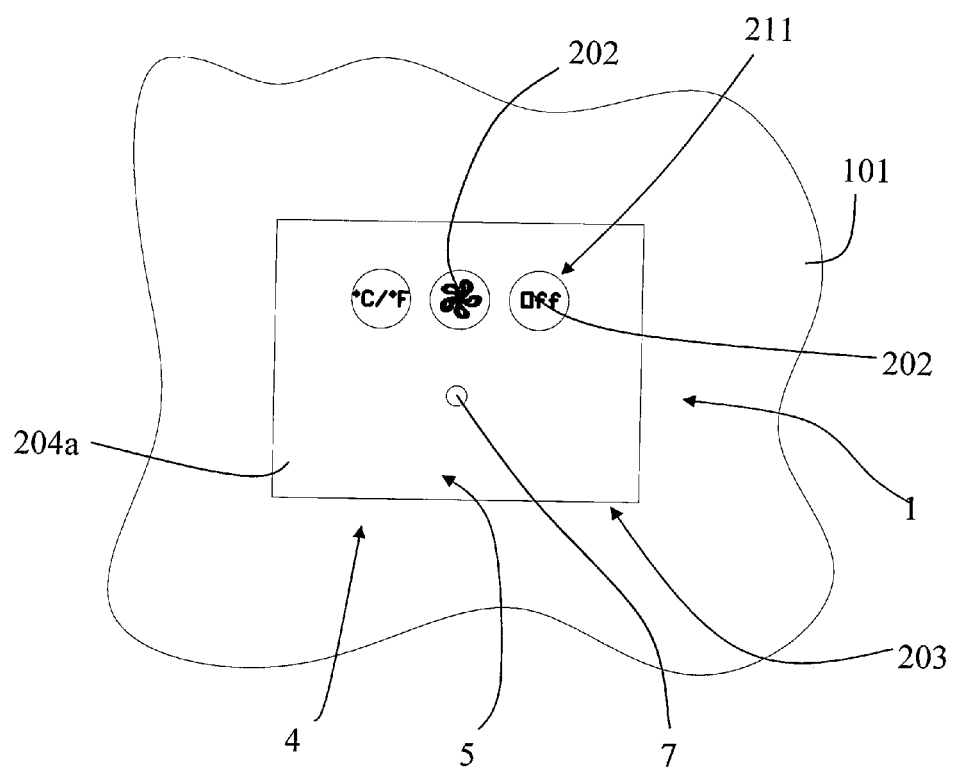
FIG. 1 shows a front view of an interactive control device according to this invention.

With reference to the accompanying drawings, the numeral 1 denotes in its entirety an interactive control device according to this invention.

More specifically, the interactive control device 1 is, in use, connected to at least one service apparatus 2. A service apparatus 2 comprises the heating system of a room or the lighting system of a room or other devices (which are not expressly listed here) aimed at providing a service to the user.

As already mentioned, the interactive control device 1 is, preferably, connected to a wall of a room of a building. Still more preferably, the building is a hotel. Moreover, the interactive control device 1 is positioned at the part of the room closest to an entrance door.

The interactive control device 1 comprises a control unit 3 connectable to the service apparatus 2 for controlling it and a screen 4 operatively connected to the control unit 3. In the preferred embodiment, the control unit 3 and the screen 4 are connected to each other and form a single body.

More specifically, the screen 4 comprises touch selection means 5 for interacting with the user. In other words, the screen 4 is of the touchscreen type in such a way as to be sensitive to the touch of the user. Preferably, the touch selection means 5 comprise a capacitive layer of the screen 4 positioned on a surface of the screen 4 on view (in use facing the user). More specifically, the touch selection means 5 also comprise a control unit operatively connected to the capacitive layer for translating the selection made on the capacitive layer into information relative to the position of the point selected by touch.

More specifically, the touch selection means 5 are configurable between an active condition wherein they receive the touch information of the user and an inactive condition wherein they do not receive the touch information of the user.

In other words, during the active condition the capacitive layer and the relative control unit of the screen 4 are powered, whilst during the inactive condition the capacitive layer and the relative control unit are not powered.

In this way, the interactive control device 1 allows an energy saving as, during the inactive condition, the capacitive layer and the relative control unit are not powered.

It should be noted that, during the active condition the screen transmits the information collected by the touch selection means 5 to the control unit 3.

Figure 3A:
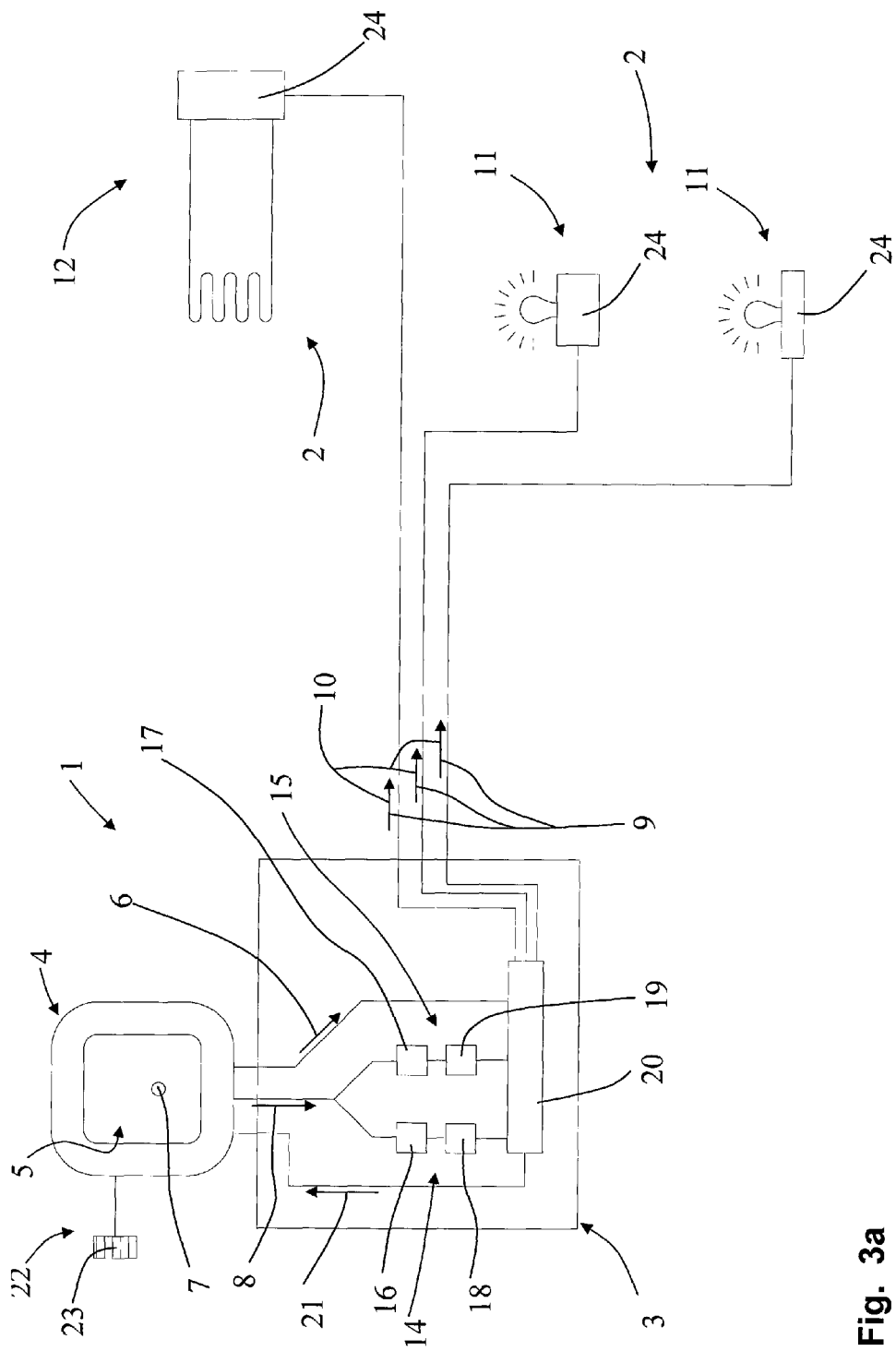
FIG. 3a shows a schematic view of a block diagram of the interactive control device according to this invention.

More specifically, during the active condition, the information collected by the touch selection means 5 is transferred to the control unit 3 by a control signal 6 (FIG. 3*a*). In other words, the touch selection means 5 are configured for generating a control signal 6 representing the selection made by the user on the screen 4.

According to this invention, the interactive control device 1 comprises a presence and distance sensor 7 operatively connected to the control unit 3 and configured for generating a detection signal 8 representing the presence and the distance of a user relative to the sensor 7. More specifically, the sensor 7 can be a passive type infrared sensor 7 of known type. This type of sensor 7 is commonly known by acronym "PIR" (Passive Infrared sensor).

Figure 2A:
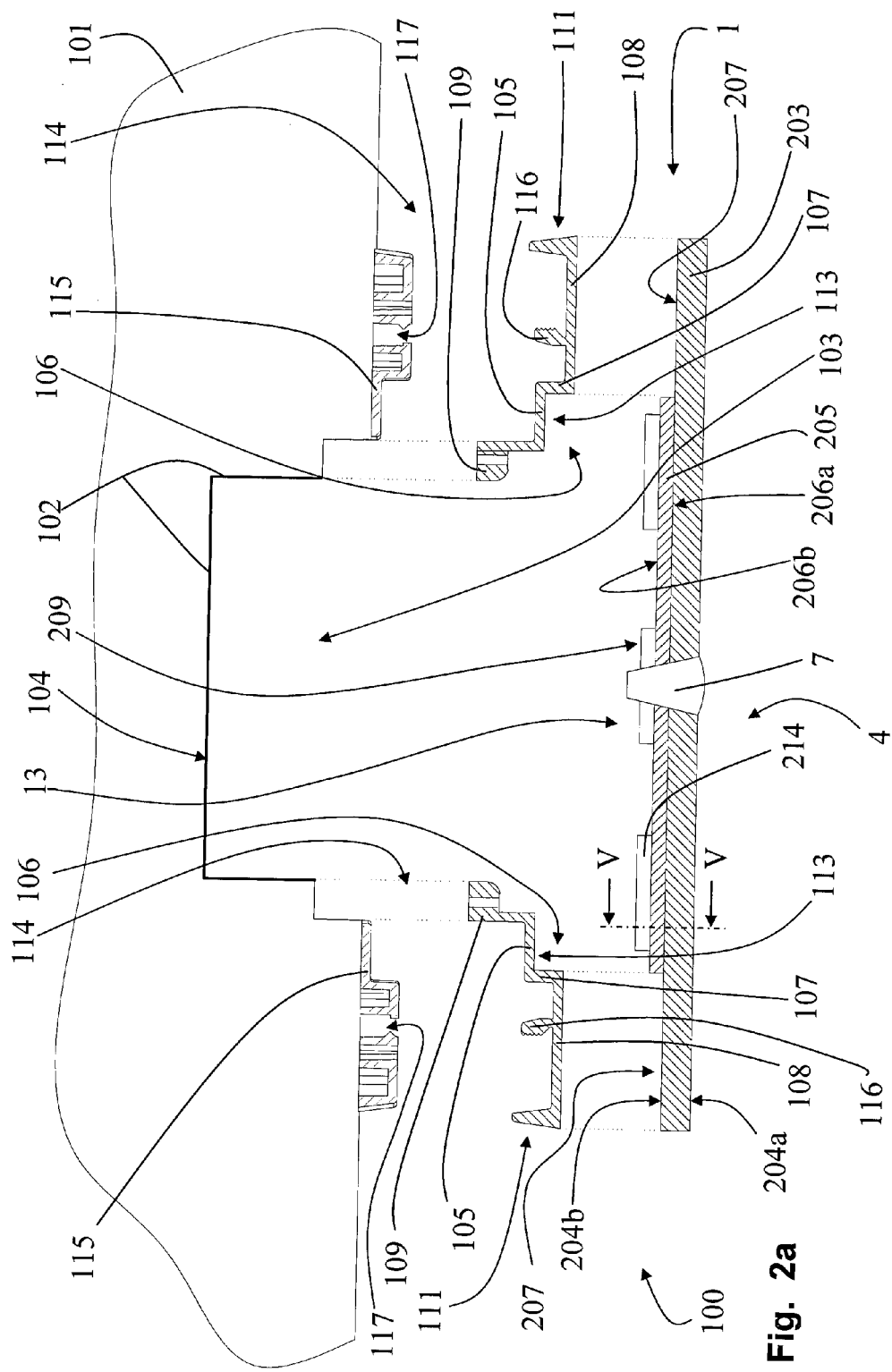
FIG. 2a shows an exploded side view of a control apparatus comprising an interactive control device according to this invention with some parts in cross-section.
Figure 2B:
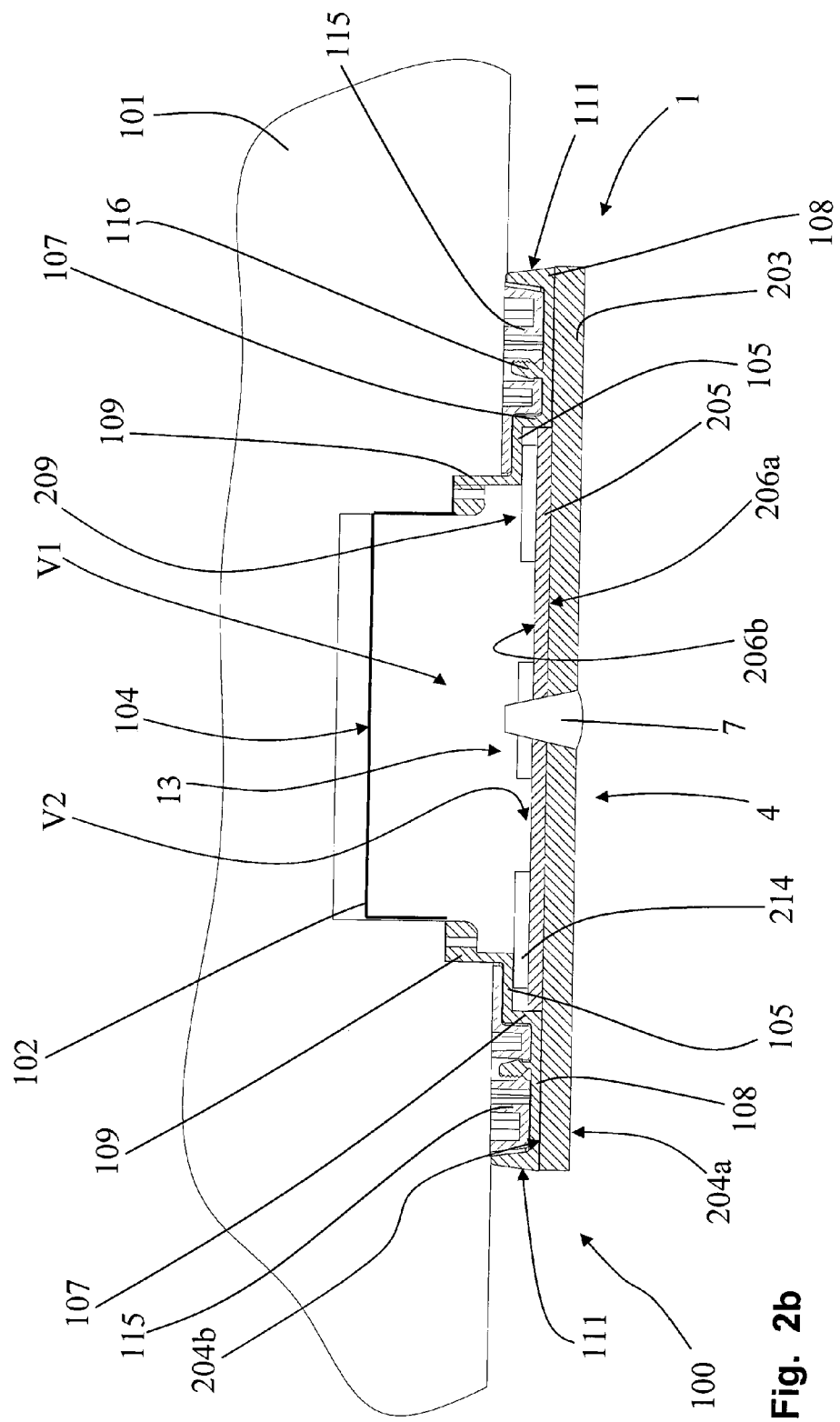
FIG. 2b shows a side view of the control apparatus illustrated in FIG. 2a assembled.

In the preferred embodiment illustrated, for example, in FIGS. 2*a* and 2*b*, the sensor 7 is located inside the screen 4 and protrudes from it towards the outside.

More specifically, the detection signal 8 generated by the sensor 7 has an undulating trend having its frequency and its amplitude variable with time. In other words, the detection signal 8 is a wave having its frequency and its amplitude variable with time.

The frequency of the detection signal 8 over a predetermined period of time represents the presence of a user close to the sensor 7 during that period of time. In other words, the presence of the user close to the sensor 7 or the movement of the user close to the sensor 7 corresponds to an increase in the frequency of the detection signal 8. In yet other words, the more frequent is the presence of the user close to the sensor 7 (movement of the user close to the sensor 7) the greater is the increase in the frequency of the detection signal 8.

Figure 4A:
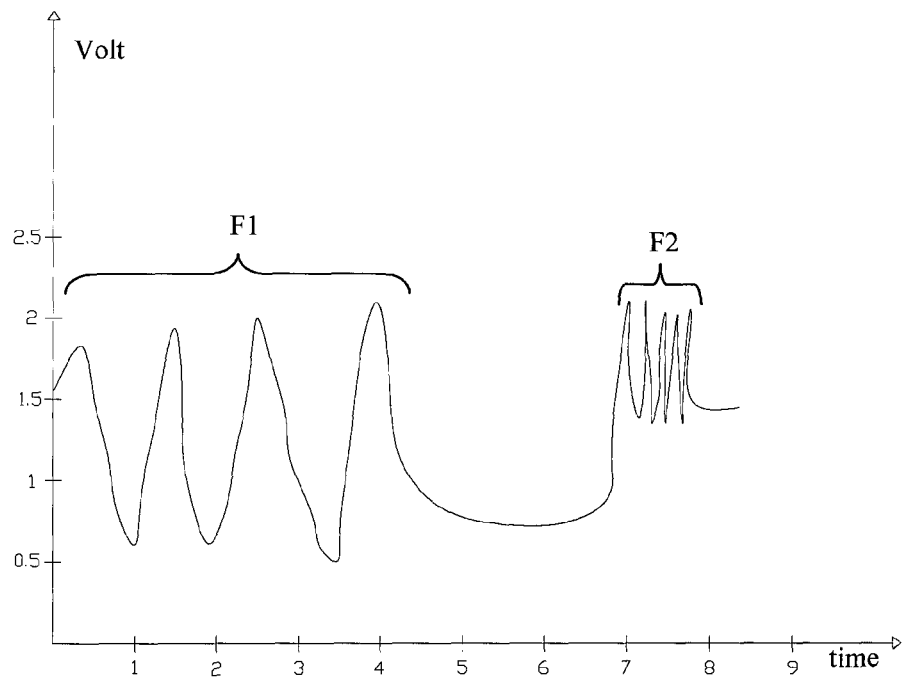
FIGS. 4a and 4b show graphs representing the detection signal generated by the interactive control device.

FIG. 4*a* represents an example of the trend of the detection signal 8 in which it is possible to see that the frequency of the signal varies over time. In detail, this figure shows that the detection signal 8 has, initially, a frequency F1 and, subsequently, a frequency F2 greater than F1. In practice, the situation of FIG. 4*a* represents the fact that the presence of the user close to the sensor 7 is increasing (from F1 to F2). It should be noted that in FIG. 4*a* the X-axis represents the time passed, whilst the Y-axis represents the voltage (measured in Volts) of the detection signal 8.

In addition, the amplitude of the detection signal 8 at a predetermined moment in time represents the distance of the user from the sensor 7 at that moment in time. In other words, the amplitude of the detection signal 8 at a predetermined moment in time is proportional to the movement of the user towards the sensor 7. In yet other words, the more the user moves towards the sensor 7 the more the frequency of the detection signal 8 increases.

Figure 4B:
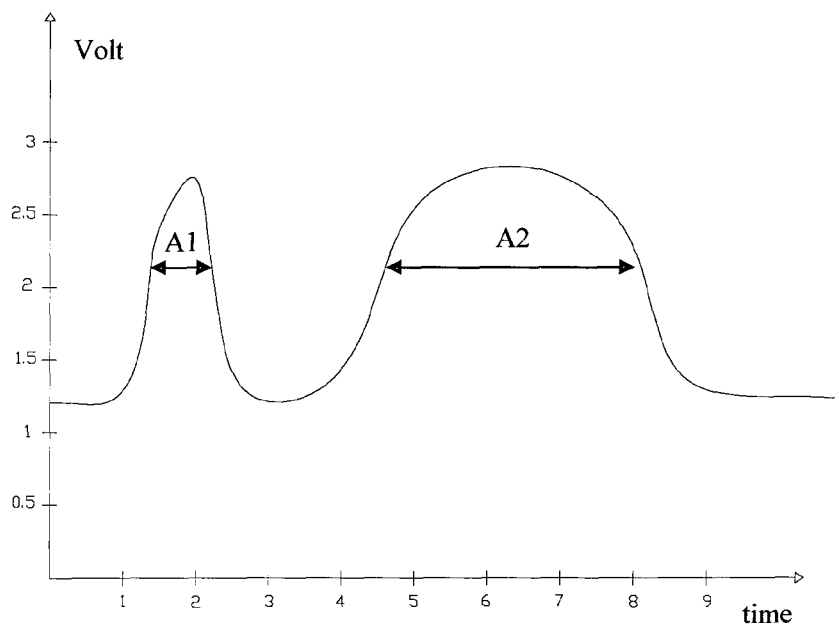

FIG. 4*b* represents an example of the trend of the detection signal 8 in which it is possible to see that the amplitude of the signal varies over time. More specifically, this figure shows that the detection signal 8 has, initially, an amplitude A1 and, subsequently, an amplitude A2 greater than A1.

It should be noted that in FIG. 4*b* the X-axis represents the time passed, whilst the Y-axis represents the voltage (measured in Volts) of the detection signal 8. In practice, the situation of FIG. 4*b* represents the fact that the user is moving towards the sensor 7. Moreover, it should be noted that the amplitude of the detection signal 8 is evaluated the same as the voltage value.

In detail, the control unit 3 is configured for:
receiving the detection signal 8;
processing the detection signal 8 for determining the presence of a user;
generating a signal for automatic control of at least part (for example the first unit or the second unit) of the service apparatus 2 as a function of the processing.

More specifically, the term "automatic" means that the control unit 3 automatically generates the automatic control signal 9 independently of the information collected from the touch selection means 5.

In effect, in this way the sensor 7 detects the presence of a user in the room and automatically controls at least one service apparatus 2. For example, once the user has entered the room, the sensor 7 detects the presence of the user, and the control unit 3, after receiving the detection signal 8, automatically switches ON the lights in the room and the heating/cooling system.

More specifically, the control unit 3 is configured for:
identifying the frequency of the detection signal 8 over a period of time;
comparing the frequency identified with a first predetermined frequency value so as to determine the presence of a user;
if the frequency of the detection signal 8 is greater than the first frequency value, generating the automatic control signal 9 of at least part of the service apparatus 2 (for example the first unit or the second unit).

In the preferred embodiment schematically illustrated in FIG. 3*a*, the control unit 3 is configured for:

identifying the frequency of the detection signal 8 over a period of time;

comparing the frequency identified with the first predetermined frequency value;

if the frequency identified is greater than the first frequency value, generating a first signal 9 for automatic control of a first group of service apparatuses;

comparing the frequency identified with a second predetermined frequency value greater than the first frequency value;

if the frequency identified is greater than the second frequency value, generating a second signal 9 for automatic control of a second group of service apparatuses different to the first group of apparatuses.

In other words, the determination of the presence of a user at the sensor 7 is divided into two levels. In a first level of simple presence, the frequency of the detection signal 8 over a period of time is greater than a first predetermined frequency value.

In a second level of activity at the sensor 7, the frequency of the detection signal 8 over a period of time is greater than a second predetermined frequency value.

In other words, when the frequency of the detection signal 8 exceeds the first value the simple presence of the user at the sensor 7 is detected, whilst when the frequency of the detection signal 8 exceeds the second value an activity of the user at the sensor 7 is detected.

Preferably, the first automatic control signal 9 controls, for example, the lighting system 11 and the heating/cooling system 12 of the room. Whilst the second automatic control signal 9 controls, for example, a night-time light guidance system for guiding the user towards the bathroom.

In other words, during use, if the simple presence of the user is detected close to the sensor 7 (frequency of the detection signal 8 greater than the first value) it means that the user has entered the room, whilst if activity of the user is detected close to the sensor 7 (frequency of the detection signal 8 greater than the second value) it means that the user is moving close to the sensor 7, for example, trying to find the lights.

Moreover, the control unit 3 is configured for:

receiving the detection signal 8;

processing the detection signal 8 for determining the distance of a user from the sensor 7;

configuring the touch selection means 5 from the inactive condition to the active condition as a function of the processing;

generating a signal 10 for manual control of the service apparatus 2 as a function of the information collected from the touch selection means 5.

In other words, when the sensor 7 detects that the user is at a certain distance from the sensor 7, the touch selection means 5 are activated so as to allow the user to enter, using the touch selection means 5, the desired parameters of the service apparatuses.

In detail, the term "manual" indicates that the content of the control signal represents the information collected from the touch selection means 5. In practice, the content of the manual control signal 10 is a function of the touch selection performed by the user on the screen 4.

To sum up, whilst a variation (according to the predetermined frequency values) of the frequency of the detection signal 8 automatically activates certain service apparatuses, the variation (according to the predetermined amplitude values) of the amplitude of the detection signal 8 activates the touch selection means 5 of the screen 4 by means of which the user can control the service apparatuses.

Moreover, the control unit 3 is configured for:

identifying the instantaneous amplitude of the detection signal 8;

comparing the amplitude identified with a first predetermined amplitude value so as to determine the distance of a user from the sensor 7;

if the amplitude of the detection signal 8 is greater than the first amplitude value, configuring the touch selection means 5 from the inactive condition to the active condition.

More in detail, when the amplitude of the detection signal 8 is greater than the first amplitude value, the touch selection means 5 are activated. In this way, the screen 4 is set up for receiving the touch information from the user and transmitting it to the control unit 3.

Moreover, the interactive control device 1 comprises means 13 for backlighting the screen 4 associated with the screen 4 and operatively connected to the control unit 3. In detail, the means 13 for backlighting the screen 4 are configurable between a switched ON condition wherein they illuminate the screen 4 and a switched OFF condition. In this situation, the control unit 3 is configured for:

identifying the instantaneous amplitude of the detection signal 8;

comparing the amplitude identified with a second predetermined amplitude value greater than the first amplitude value;

if the amplitude of the detection signal 8 is less than or equal to the second amplitude value, configuring the means 13 for backlighting the screen 4 from the switched OFF condition to the switched ON condition.

It should be noted that the first amplitude value corresponds to a first distance value of the user from the sensor 7 and the second amplitude value corresponds to a second distance value of the user from the sensor 7. More in detail, the first distance value is greater than the second distance value.

In other words, as the user moves towards the sensor 7 the screen 4 modifies its configuration in this way:

firstly, the touch selection means 5 are activated;

subsequently, the illumination of the screen 4 is activated.

In this way, the screen 4 is only switched ON when the user is at such a distance from the sensor 7 that the desire to interact with the interactive control device 1 is unquestionable, thereby optimizing the energy saving.

In addition, the backlighting means 13 comprise a plurality of illumination bodies 209 as described in more detail below.

Moreover, as shown in FIG. 3a, the control unit 3 comprises a relative sub-unit 14 for analyzing the frequency of the detection signal 8 and a relative sub-unit 15 for analyzing the amplitude of the detection signal 8. Preferably, each analysis sub-unit 14, 15 comprises a relative unit 16, 17 for calculating the frequency and the amplitude of the detection signal 8 and a relative unit 18, 19 for comparing the frequency and amplitude values with the respective predetermined values.

Moreover, the control unit 3 comprises a relative processing sub-unit 20 operatively connected with each comparison unit 18, 19 and configured for generating the automatic control signal 9 and the manual control signal 10 of the service apparatus 2.

Moreover, the processing sub-unit is configured for generating a signal 21 for activating the touch selection means 5 as a function of the results of the comparison units in such a way as to configure the touch selection means 5 from the inactive condition to the active condition.

In addition, the processing sub-unit is configured for receiving the control signal 6 when the touch selection means 5 are configured in the active condition.

In addition, the control unit 3 comprises a clock configured for modifying the content of the automatic control signal 9 as a function of the time. More specifically, the clock selects/deselects the service apparatuses which can be controlled by the control unit 3 as a function of the time.

Moreover, the control unit 3 comprises a timing sub-unit configured for:

measuring a time interval following configuration of the touch selection means 5 from the inactive condition to the active condition;

setting to zero and restarting the time measurement upon every interaction of the user with the touch selection means 5;

instantaneously comparing the measured time interval with a preset period of time;

if the measured time interval is greater than the preset period of time, configuring the touch selection means 5 from the active condition to the inactive condition.

Advantageously, the control unit 3 allows the touch selection means 5 to be changed from the inactive condition to the active condition following a predetermined period of time in such a way as to reduce the energy consumption.

Preferably, the interactive control device 1 comprises battery and/or photovoltaic power supply means 22. More specifically, FIG. 3a shows a photovoltaic panel 23 connected directly to the interactive control device 1 for the electricity supply. Yet more specifically, the photovoltaic panel 23 is preferably positioned close to the screen 4.

Figure 3B:
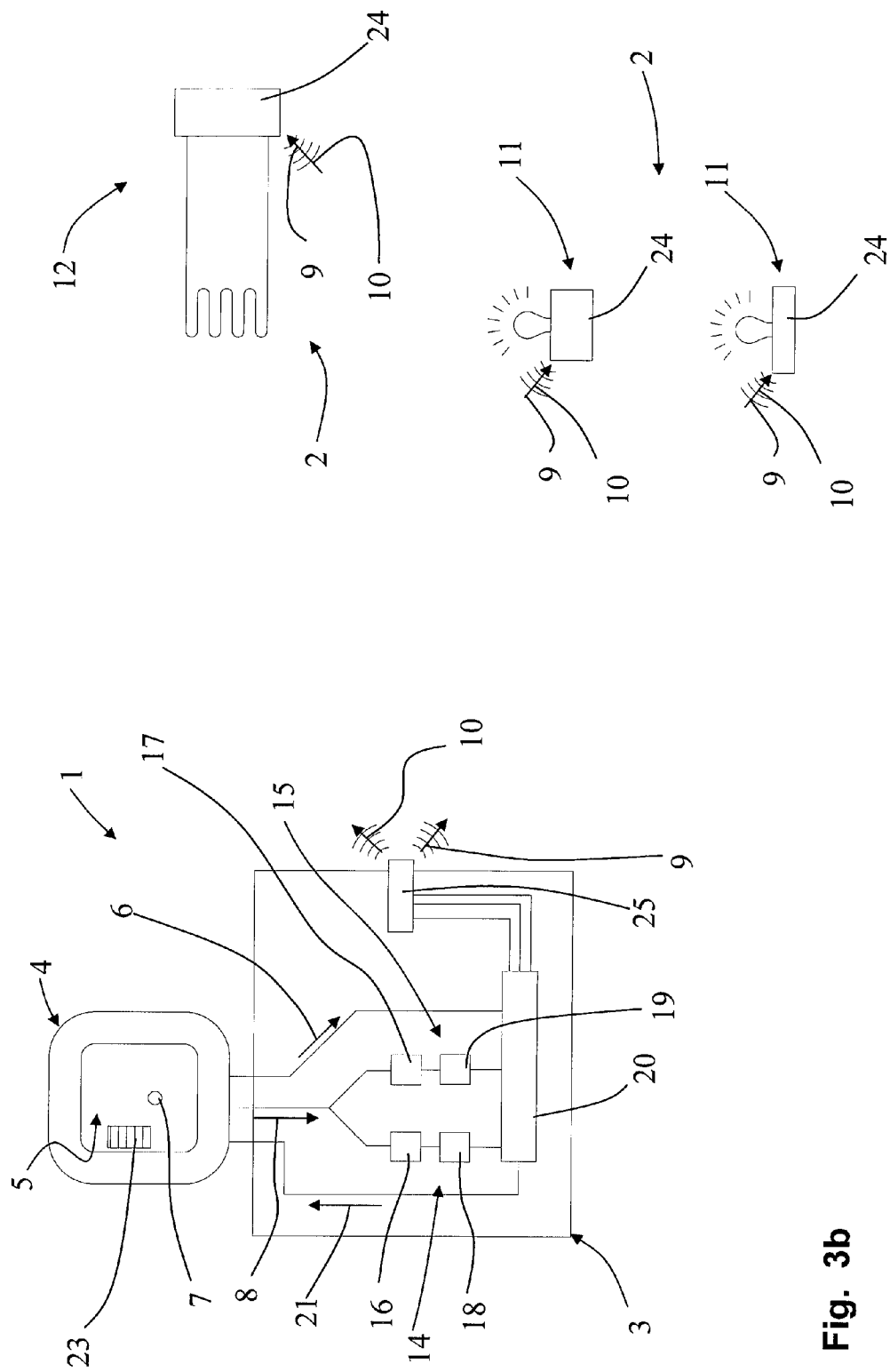
FIG. 3b shows a schematic view of an alternative embodiment of the block diagram of the interactive control device according to this invention.

In an alternative embodiment illustrated in FIG. 3b, the photovoltaic panel 23 is integrated in the screen 4. In other words, the photovoltaic panel is position in the area dedicated to the screen 4 in such a way as to form a single body with the screen 4.

Advantageously, thanks to the activation/deactivation of the touch selection means 5 according to this invention, the energy consumptions linked with the interactive control device 1 are less than that of the prior art, thus favoring the use of battery and/or photovoltaic power supply means 22.

Moreover, it should be noted that the service apparatus 2 comprises control modules 24 each of which is configured for:

receiving the automatic or manual control signals 9, 10;

controlling the service apparatus 2 as a function of the contents of the control signals 9, 10.

More specifically, the control modules 24 can be connected to the control unit 3 using electricity cables or by wireless transmission means (commonly known as "wireless").

In detail, in FIG. 3a the control modules 24 are connected to the control unit 3 using electricity cables. Whilst in FIG. 3b the control modules 24 are connected to the control unit 3 by wireless transmission means. In the latter case, each control module 24 and the control unit 3 comprise a respective wireless communication interface 25 which allows the information to be transmitted from the control unit 3 to the control modules 24.

Moreover, FIGS. 3a and 3b show that at least one control module 24 is associated with a respective part of the service apparatus 2 (for example, with the first unit or the second unit). For example, in FIGS. 3a and 3b, a first and a second control module 24 are associated with the lighting system 11, whilst a third control module 24 is associated with the heating/cooling system 12.

Advantageously, the use of battery and/or photovoltaic power supply means 22 makes the interactive control device 1 independent from a point of view of power supply (as it is not linked to connections with the mains power supply to the room) making the wireless transmission system from the control unit 3 to the service apparatus 2 more usable (FIG. 3b).

In effect, in this situation, the position of the interactive control device 1 inside the room can be easily modified as it is not restricted by the layout of the mains power supply.

In a preferred embodiment not shown in the accompanying drawings, the interactive control device 1 comprises a plurality of detectors associated with the service apparatus 2 for monitoring the status. More specifically, each detector is configured for generating a respective status signal and for sending it to the control unit 3.

The control unit 3 is configured for:

receive the status signal;

modifying the content of the automatic or manual control signal 9 as a function of the content of the status signal.

For example, a detector can be associated with the entrance door to the room. In this way, the control unit 3 is able to detect the movement of the door and compare that information with the content of the detection signal 8. Thus, there can be two cases:

detection of the movement of the entrance door and consequent detection at least of the presence of a user in the room;

detection at least of the presence of a user in the room and consequent detection of the movement of the entrance door.

Advantageously, in the first case, the control unit 3 receives the information relative to the entry of the user in the room, whilst in the second case the control unit 3 receives the information relative to the exit of the user from the room. Consequently, the interactive control device 1 is able to understand the direction of the user relative to the room in which the interactive control device 1 is located.

Moreover, in the preferred embodiment, the interactive control device 1 comprises a containment box 102 mounted on a wall 101 having a front opening 103 and which can be inserted in a housing formed on the wall 101. The containment box has a front frame 111 positioned at the front opening 103. More specifically, the control unit 3 of the interactive control device 1 is positioned in the housing. Obviously, the screen 4 is connected to the front frame 111 for closing the front opening 103 in such a way that the screen 4 is on view.

Moreover, a description is given below of the remaining part of the interactive control device 1.

More specifically, the screen 4 is at least in part transparent on which at least one graphical symbol 202 is delineated.

Preferably, the screen 4 is a glass panel. Moreover, the graphical symbols 202 are delineated on the screen 4 by xerographic and/or by pre-cut adhesive films. In detail, a contour line of each graphical symbol 202 is delineated on the screen 4 in such a way as to define an image inside the contour.

More in detail, the screen 4 is at least partly transparent only at the graphical symbols 202. In other words, the screen 4 is non-transparent where the graphical symbols 202 are not delineated. In other words again, the screen 4 lets the light pass only at the graphical symbols 202.

Moreover, the screen 4 extends in a single plane and has a visible face 204a and a rear face 204b opposite the visible face 4a. The visible face 204a is the face visible by a user. In addition, the rear face 204b defines a connection plane.

Preferably, the visible face 204a and the rear face 204b are substantially parallel to each other.

The interactive control device 1 also comprises a support panel 205 connected to the screen 4 and having a first surface 206a facing the screen 4 and a second surface 206b opposite the first surface 6a.

Preferably, the support panel 205 is flat and it is substantially parallel to the screen 4. In addition, the first surface 206a of the support panel 205 is substantially parallel to the second surface 206b of the support panel 205. Moreover, the support panel 205 is connected to the screen 4 at the first surface 6a. More specifically, the first surface 206a of the support panel 205 is connected to the rear face 204b of the screen 4 along the connection plane.

As shown in FIG. 1a, the support panel 205 has a planar extension having dimensions less than the dimensions of the planar extension of the screen 4.

In addition, the support panel 205 is positioned centrally relative to the screen 4. In other words, the screen 4 forms a strip 207 surrounding the support panel 205. The surrounding strip 207 is defined on the rear face 204b of the screen 4.

Preferably, the thickness of the screen 4, measured transversely to the connection plane, is between 3 millimeters and 5 millimeters. Preferably, the thickness of the support panel 205, measured transversely to the connection plane, is between 1 millimeter and 2.5 millimeters.

Moreover, the support panel 205 has at least one hole 208 passing from the second surface 206b to the first surface 6a. FIG. 205 shows an example of support panel 205 having three through holes 208.

Preferably, each hole 208 defines a circle having a diameter of between 5 millimeters and 50 millimeters.

Moreover, the interactive control device 1 comprises at least one illumination body 209 emitting a light beam 210 passing through the hole 208 for illuminating the graphical symbol 202 on the screen 4. In other words, the illumination body 209 illuminates the screen 4 through the hole 208 for accessing the graphical symbol 202 of interest.

More in detail, the illumination body 209 illuminates an area of illumination 211 on the screen 4 at a graphical symbol 202. Consequently, the light beam 210 passes where the screen 4 is at least partly transparent and is blocked in the remaining part of illumination area 211 so as to only illuminate the graphical symbol 202.

As already mentioned, the illumination bodies 209 together form the means 13 for backlighting the interactive control device 1.

More specifically, the light beam 210 strikes the screen 4 at the rear face 204b of the screen 4 and illuminates the graphical symbol 202 at the visible face 4a. In other words, the screen 4 filters the light beam 210 for highlighting a graphical symbol 202 on the visible face 4a.

It should be noted that the support panel 205 is interposed between the illumination body 209 and the screen 4. In this way, the light beam 210 passing through the hole 208 delineates the area of illumination 11 on the screen 4.

Preferably, the illumination body 209 comprises a LED. More specifically, the illumination body 209 extends between its emitting portion 212a and its supply portion 212b. It should be noted that the emitting portion 212a of the luminous body faces towards the relative hole 208 so as to emit the light beam 210 in the direction of the hole 8.

According to this invention, the illumination body 209 is connected to the support panel 205 at the hole 208.

More specifically, the second surface 206b of the support panel 205 forms a border area A positioned around the hole 208. The illumination body 209 is connected to the border area A of the support panel 205.

Figure 5:
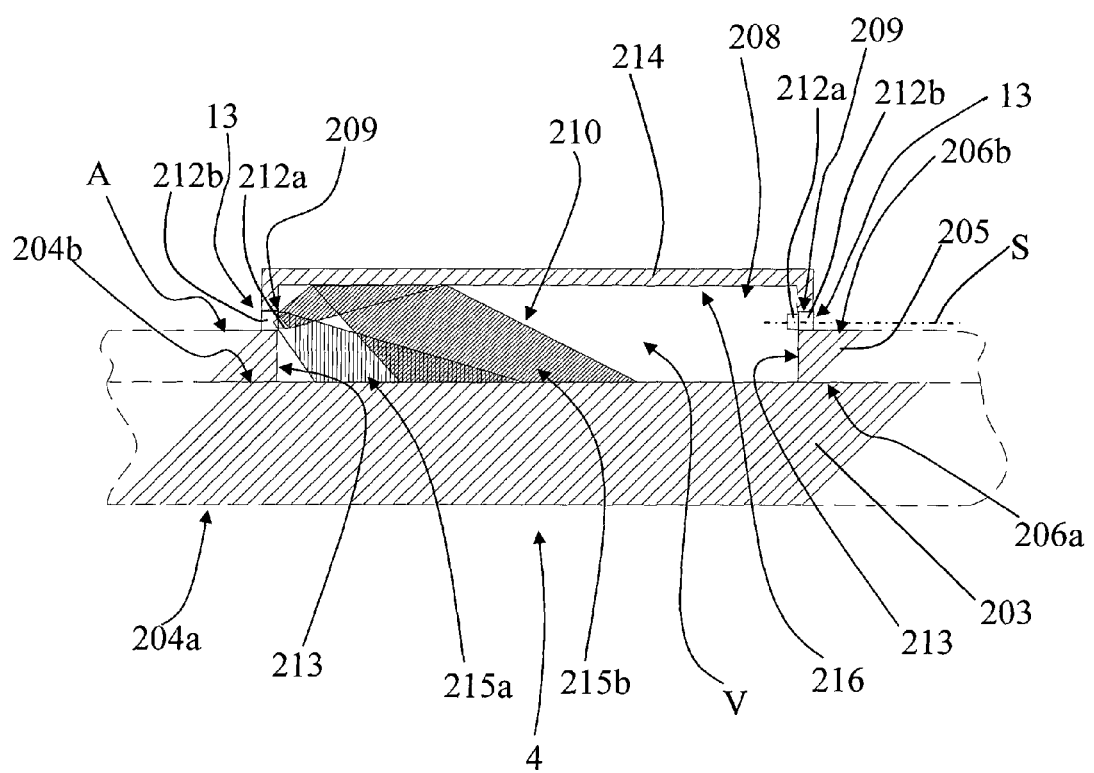
FIG. 5 shows a side view of a detail of the interactive control device illustrated in FIG. 2a sectioned along the cross-sectional line III-III.

FIG. 5 shows that the illumination body 209 is connected to the border area A of the support panel 205 at its supply portion 212b. More specifically, the emitting portion 212a of the illumination body 209 faces the relative hole 8. Yet more specifically, the emitting portion 212a of the illumination body 209 protrudes in a cantilever fashion from the relative hole 208.

It should be noted that the illumination body 209 extends along a direction of extension S from the emitting portion 212a to the supply portion 212b. This direction of extension S of the illumination body 209 is preferably parallel to the connection plane.

Moreover, the interactive control device 1 preferably comprises a plurality of illumination bodies 209 positioned at a hole 208. More in detail, the illumination bodies 209 are distributed uniformly around the hole 208. For example, the interactive control device 1 comprises eight illumination bodies 209 for each hole 8. Each illumination body 209 emits its light beam 210 which generates a respective illumination area 11. The set of illumination areas 211 defines the operating area of the screen 4.

It should be noted that each illumination body 209 emits a light beam 210 having a main direction of propagation substantially parallel to the connection plane. In addition, the angle of opening of the light beam covers at least part of the hole 208. Moreover, the support panel 205 has an annular surface 213 positioned around the hole 208 and between the first surface 206a and the second surface 206b. The angle of opening of the light beam covers at least part of the annular surface 213. In other words, the illumination body 209 emits a light beam towards a part of the annular surface 213.

The interactive control device 1, in accordance with this invention, comprises a shell 214 positioned at the hole 208 and connected to the support panel 205. Preferably, the shell 214 is connected to the second surface 206b of the support panel 205.

The illumination body 209 is interposed between the shell 214 and the support panel 205 in such a way that the shell 214 diffuses and/or reflects the light beam 210 towards the hole 208 and thus in the direction of the screen 4.

In other words, the illumination body 209 emits a light beam 210 of which a first part 15a passes directly through the hole 208, whilst a second part 215b passes through the hole 208 by reflection on the shell 214 (FIG. 5).

Moreover, the shell 214 has an inner surface 216 facing the hole 208. The inner surface 216 of the shell 214 is preferably reflective.

Moreover, the inner surface 216 of the shell 214 has microscopic irregularities which diffuse the light. More in detail, the dimensions of the irregularities of the inner surface 216 of the shell 214 are comparable with the wavelength of the light rays which constitute the beam.

Therefore, in the preferred embodiment the shell 214 reflects and diffuses the light.

Preferably, the shell 214 extends at least for the entire width of the hole 208 and it is positioned alongside the second surface 206b of the support panel 205 in such a way as to form an inner space V between the shell 214 and the hole 208.

In other words, the shell 214 closes the hole 208 at the second surface 206b of the support panel 205.

More in detail, the shell 214 is delimited by an outer edge. This edge of the shell 214 is connected to the second surface 206b of the support panel 205.

Moreover, the illumination body 209 operates inside the inner space V. In other words, the illumination body 209 emits the light beam inside the inner space V. In yet other words, the emitting portion 212a of the illumination body 209 is positioned inside the inner space V.

Preferably, the support panel 205 has a plurality of holes 208 each positioned at a graphical symbol 202 of the screen 4. Each hole 208 is associated with a respective shell 214.

More in detail, the shell 214 at the illumination bodies 209 is connected to the supply portion 212b.

Preferably, the support panel 205 comprises an electronic card.

Moreover, the interactive control device 1 comprises a containment box 102 having a front opening 103 and which can be inserted in a housing formed on a wall 101 of a room. The containment box 102 also has a bottom wall 104 opposite the front opening 103 and, in use, positioned inside the wall 101. In other words, the containment box 102 extends along a direction of extension from the bottom wall 104 to the front opening 103. The direction of extension of the containment box 102 is substantially transversal to the bottom wall 104 of the containment box 102.

Preferably, the containment box 102 is substantially shaped to match the housing of the wall 101.

Moreover, the interactive control device 1 comprises a front frame 111 connected to the containment box 102 at the front opening 103. More in detail, the front frame 111 extends around the front opening 103 and it is, during use, at least partly superposed on the wall 101.

In addition, the screen 4 is connected to the front frame 111 for closing the front opening 103 in such a way that the screen 4 is on view. In other words, the front frame 111 is interposed between the containment box 102 and the screen 4.

Moreover, the front frame 111 comprises a front portion 108 which extends outside the containment box 102 and the screen 4 is connected on the front portion 108.

According to this invention, the front frame 111 comprises a wide portion 105 extending from the front opening 103 towards the outside of the containment box 102 and, in use, placed upon the wall 101. In other words, the wide portion 105 extends transversely to the direction of extension of the containment box 102. In other words, the wide portion 105 protrudes from the containment box 102.

The front frame 111 forms a perimeter housing 106 between the screen 4 and the wide portion 105 for containing at least part of an illumination body 209 of the interactive control device 1. It should be noted that the perimeter housing 106 encircles the front opening of the containment box 102.

Preferably, the wide portion 105 lies on a supporting surface substantially parallel to the bottom wall 104 of the containment box 102.

Preferably, the wide portion 105 has a dimension, measured parallel to the supporting surface, of between 5 millimeters and 20 millimeters.

Moreover, the box comprises a perimeter panel 107 extending substantially transversely to the supporting surface away from the bottom wall 104 of the containment box 102. The perimeter housing 106 is delimited laterally by the perimeter panel 107.

The perimeter panel 107 has a height, measured transversely to the supporting surface, preferably between 2 millimeters and 5 millimeters.

Moreover, the front portion 108 is positioned around the perimeter housing 106. In other words, the front portion 108 defines a frame around the perimeter housing 106.

It should be noted that the front portion 108 of the box lies on a connecting surface on which the screen 4 is connected. The connecting surface is substantially parallel to the supporting surface.

In other words, the containment box 102 defines, internally, a first housing space V1 between the bottom wall 104 and the supporting surface, and a second housing space V2 between the supporting surface and the connecting surface (FIG. 2a). Moreover, the second housing space V2 has a width, measured parallel to the connecting surface along a predefined direction, greater than the width, measured parallel to the supporting surface and parallel to the predefined direction, of the first housing space V1. In addition, the second housing space V2 comprises the perimeter housing 106.

More specifically, the front portion 108 is spaced from the wide portion 105. Yet more specifically, the perimeter panel 107 is interposed between the front portion 108 and the wide portion 105. In other words, the connecting surface is spaced from the supporting surface. Preferably, the distance between the connecting surface and the supporting surface is between 2 millimeters and 5 millimeters.

In other words, the distance between the rear face 204b of the screen 4 and the wide portion 105 is between 2 millimeters and 5 millimeters.

Practically, the perimeter housing 106 is comprised between the wide portion 105, the connecting surface and the perimeter panel 107.

Preferably, the support panel 205 and, at least partly, a shell 214, is positioned in the perimeter housing 106. In other words, the support panel 5, the illumination bodies 209, the shells 214 and the control unit 3 are positioned in the second housing space V2 (FIG. 2b).

The interactive control device 1 also comprises means 114 of connecting the front frame 111 to the wall 102. The connection means 114 comprise a supporting frame 115 substantially shaped to match the front frame 111 and fixable to the wall 101. More specifically, the supporting frame 115 is interposed between the front frame 111 and the wall 101. Moreover, the supporting frame 115 is fixed to the wall 101 by screws.

In addition, the connection means 114 comprise a plurality of appendages 116 mounted on the front frame 111 and protruding from it in the direction of the supporting frame 115 for fastening the front frame 111 to the supporting frame 115. Moreover, the connection means 214 have slots 117 substantially shaped to match the appendages 116 in which the appendages 116 are fastened.

Advantageously, the supporting frame 115 is first fixed to the wall 101 and the front frame 111 is then fastened to the supporting frame 115.

The supporting frame 115 also comprises connection portions 109 projecting towards the inside of the containment box 102. In other words, the connection portions 109 face the front opening 103. Advantageously, the connection portions 109 are perforated and allow the supporting frame 115 to be connected to the wall 101 by screws. Correspondingly, the support panel 205 has side portions 110 substantially shaped to match the connection portions 109 of the containment box 102.

Moreover, the front frame 111 comprises cover portions 112 substantially shaped to match the connection portions 109 and positioned at the connection portions 109 for covering them.

In an alternative embodiment not shown in the accompanying figures, the interactive control device 1 does not comprise the shell 214. In the alternative embodiment, the wide portion 105 of the front frame 111 has a reflective surface 113. More specifically, the reflective surface 113 of the front frame 111 faces the illumination body 209 and reflects the light emitted by the illumination body 209 towards the screen 4. Preferably, the reflective surface 113 is formed by a reflective film (for example, colored white) or by a reflective paint applied to the wide portion 105.

With regard to the operation, the interactive control device 1 for graphical symbol 202 allows a graphical symbol 202 to be illuminated on the screen 4 by the projection of a light beam 210 by an illumination body 209.

More in detail, the illumination body 209 emits a light beam 210 which partly passes directly through a hole 208 and is partly reflected on the shell 14. Moreover, the shell 214 diffuses the light towards the hole 208.

In addition, the interactive control device 1 is mounted on a containment box 102 having a perimeter housing 106 which is placed upon the wall 101. The perimeter housing 106 houses at least one illumination body 209 with a respective shell 214.

This invention also relates to a system for controlling service apparatuses 2 comprising a plurality of control modules 24 (of the type described above) each operatively associated with a respective service apparatus 2 for controlling it.

Moreover, the system comprises at least one interactive control device 1 operatively connected to each control module 24 for sending to the latter the automatic control signals 9 and/or the manual control signals 10 as described above.

In addition, the system comprises a plurality of interactive control devices 1 connected to each other and distributed inside the room. Advantageously, each control device 1 is spaced from the other in such a way as to control the service apparatuses 2 of a room from different positions.

The invention achieves the preset aims.

More specifically, this invention makes the interactive control device easy to identify by a user as it is activated when the user moves towards it.

Moreover, the interactive control device is at least partly independent with respect to the presence of the user since, once the simple presence of the user is detected, it independently activates part of the service apparatus.

Lastly, this invention allows an energy saving (the interactive control device is only activated when necessary) in such a way that it can be powered by "low output" energy sources such as batteries and/or solar panels. Advantageously, this latter aspect facilitates and improves the use of wireless communication means between the control unit and the control modules.

The invention claimed is:

1. An interactive control device (1) for at least one service apparatus (2), comprising:
    a control unit (3) connectable to the service apparatus (2) for controlling it;
    a screen (4) operatively connected to the control unit (3) and comprising touch selection means (5) for interacting with a user; the touch selection means (5) being configurable between an active condition wherein the touch selection means are powered and receive the touch information of the user and an inactive condition wherein the touch selection means are not powered and do not receive the touch information of the user; during the active condition, the touch selection means (5) being configured for generating a control signal (6) representing the touch selection performed by the user and for sending said control signal (6) to the control unit (3);
    characterized in that it comprises a presence and distance sensor (7) operatively connected to the control unit (3) and configured for generating a detection signal (8) representing the presence and the distance of the user relative to the sensor (7); the control unit (3) being configured for:
    receiving the detection signal (8);
    processing the detection signal (8) for determining the presence of the user;
    generating at least one signal (9) for automatic control of at least part of the service apparatus (2) as a function of the processing; the control unit (3) being configured for generating the automatic control signal (9) as a function of the presence of the user in a room independently of the information collected from the touch selection means (5);
    the control unit (3) being also configured for:
    receiving the detection signal (8);
    processing the detection signal (8) for determining the distance of the user from the sensor (7);
    configuring the touch selection means (5) from the inactive condition to the active condition when the user is at a predetermined distance from the sensor (7) in order to power-on the touch selection means (5);
    generating a signal (10) for manual control of the service apparatus (2) as a function of data contained in the control signal (6) received by the control unit (3); the manual control signal (10) representing information collected from the touch selection means (5);
    wherein the detection signal (8) has an undulating trend having its frequency and its amplitude variable with time; the frequency of the detection signal (8) representing the presence of the user close to the sensor (7), the amplitude of the detection signal (8) representing the distance of the user from the sensor (7); the control unit (3) being configured for:
    identifying the frequency of the detection signal (8) over a period of time;
    comparing the frequency identified with a first predetermined frequency value so as to determine the presence of the user;
    if the frequency of the detection signal (8) is greater than the first frequency value, generating the automatic control signal (9);
    the control unit (3) being configured for:
    identifying the instantaneous amplitude of the detection signal (8);
    comparing the amplitude identified with a first predetermined amplitude value so as to determine the distance of the user from the sensor (7);
    if the amplitude of the detection signal (8) is greater than the first amplitude value, configuring the touch selection means (5) from the inactive condition to the active condition.

2. The interactive control device according to claim 1 characterized in that the control unit (3) is configured for:
    if the frequency identified of the detection signal (8) is greater than the first frequency value, generating a first signal (9) for automatic control of a first group of service apparatuses;
    comparing the frequency identified of the detection signal (8) with a second predetermined frequency value greater than the first frequency value;

if the frequency identified is greater than the second frequency value, generating a second signal (9) for automatic control of a second group of service apparatuses different to the first group of apparatuses.

3. The interactive control device (1) according to claim 1, characterized in that it comprises means (13) for backlighting the screen (4) associated with the screen (4) and operatively connected to the control unit (3); the means (13) for backlighting the screen (4) being configurable between a switched ON condition wherein they illuminate the screen (4) and a switched OFF condition; the control unit (3) being configured for:
- identifying the instantaneous amplitude of the detection signal (8);
- comparing the amplitude identified with a second predetermined amplitude value greater than the first amplitude value;
- if the amplitude of the detection signal (8) is less than or equal to the second amplitude value, configuring the means (13) for backlighting the screen (4) from the switched OFF condition to the switched ON condition.

4. The interactive control device (1) according to claim 1, characterized in that the control unit (3) comprises a clock; the clock being configured for modifying the content of the automatic control signal (9) as a function of the time, selecting/deselecting the service apparatuses which can be controlled by the control unit (3).

5. The interactive control device (1) according to claim 1, characterized in that the control unit (3) comprises a timing sub-unit configured for:
- measuring a time interval following configuration of the touch selection means (5) from the inactive condition to the active condition;
- setting to zero and restarting the time measurement upon every interaction of the user with the touch selection means (5);
- instantaneously comparing the measured time interval with a preset period of time;
- if the measured time interval is greater than the preset period of time, configuring the touch selection means (5) from the active condition to the inactive condition.

6. The interactive control device (1) according to claim 1, characterized in that it comprises battery power supply means (22).

7. The interactive control device (1) according to claim 1, characterized in that it comprises photovoltaic power supply means (22).

8. The interactive control device (1) according to claim 1, characterized in that the presence and distance sensor (7) is a passive type infrared sensor (7).

9. The interactive control device (1) according to claim 1, characterized in that it comprises:
- a containment box (102) mounted on a wall (101) having a front opening (103) and which can be inserted in a housing formed on the wall (101); the control unit (3) being located in the housing; the containment box (102) having a front frame (111) located at the front opening (103);
- the screen (4) being connected to the front frame (111) for closing the front opening (103) in such a way that the screen (4) is on view.

10. A system for controlling service apparatuses (2) comprising:
- a plurality of control modules (24) each operatively associated with a respective service apparatus (2) for controlling it;
- at least one interactive control device (1) according to claim 1; the interactive control device (1) being operatively connected to each control module (24) for sending to the latter the automatic control signals (9) and/or the manual control signals (10).

11. A system for controlling service apparatuses (2) according to claim 10 characterized in that it comprises a plurality of interactive control devices (1) connected to each other; each interactive control device (1) being spaced from the others in such a way as to control the service apparatuses (2) of a room from different positions.

\* \* \* \* \*